United States Patent [19]

Gravey et al.

[11] 4,182,747

[45] Jan. 8, 1980

[54] PROCESS FOR PREPARATION OF ANHYDROUS METALLIC CHLORIDES FROM WASTE CATALYSTS

[75] Inventors: Guy Gravey; Jean Le Goff; Christian Gonin, all of Moutiers, France

[73] Assignee: Metaux Speciaux S.A., Paris, France

[21] Appl. No.: 862,594

[22] Filed: Dec. 20, 1977

[30] Foreign Application Priority Data

Dec. 30, 1976 [FR] France ............................ 76 39842

[51] Int. Cl.² ............................................ C01B 9/02
[52] U.S. Cl. .................................. 423/491; 423/60;
423/62; 423/116; 423/137; 423/150; 423/492;
423/493; 423/496; 252/411 R
[58] Field of Search ............... 252/415, 416, 419, 411,
252/414; 423/60, 62, 65, 116, 136, 137, 150,
492, 493, 495, 496

[56] References Cited

U.S. PATENT DOCUMENTS

| | | | |
|---|---|---|---|
| 1,911,505 | 5/1933 | Herold et al. | 423/60 |
| 3,066,010 | 11/1962 | Horning et al. | 423/60 |
| 3,172,864 | 3/1965 | Unverferth | 252/419 |
| 3,180,706 | 4/1965 | Erickson | 423/60 |
| 3,197,284 | 7/1965 | Hoekstra | 252/419 |
| 3,565,820 | 2/1971 | Coons et al. | 252/419 |
| 3,985,639 | 10/1976 | Suggitt et al. | 252/415 |

FOREIGN PATENT DOCUMENTS 65929 11/1972 Poland ............................ 423/60

*Primary Examiner*—Earl C. Thomas
*Attorney, Agent, or Firm*—Dennison, Dennison, Meserole & Pollack

[57] ABSTRACT

A process is disclosed for recovering metallic constituents of spent or waste catalysts containing metallic compounds fixed on an aluminous support. The process is particularly applicable for the recovery of metals such as Al, Mo, V, Ni and Co, contained in spent catalyst. The process comprises transforming the metals to be recovered into volatile chlorides by carbochlorination and then separating the chlorides obtained by dry means and fixing them successively in a selective manner. The separation of $AlCl_3$ is accomplished by passage through granules of anhydrous NaCl, and the separation of $MoCl_5$ by passage through granules of crystallized KCl. The process is particularly suitable for the treatment of waste catalyst from the catalytic hydrocracking or hydrodesulfurization of oils.

18 Claims, No Drawings

PROCESS FOR PREPARATION OF ANHYDROUS METALLIC CHLORIDES FROM WASTE CATALYSTS

BACKGROUND OF THE INVENTION

It is generally known that it is possible to treat waste catalysts such as those used in oil refining to recover valuable compounds or elements contained therein.

U.S. Pat. No. 2,367,506 describes a process for recovery of the molybdenum present in spent hydroforming catalysts having an activated alumina support. The process impregnates the catalyst with a sodium carbonate solution, then heats the impregnated catalyst to 1150° C. The sodium molybdate which is thus formed is dissolved in water, and the solution is treated to recover a molybdenum compound. This process, in which the final treatment is effected by wet means, is practical only for the recovery of an oxide or a salt of molybdenum.

Dutch (Netherlands) Application No. 74-16155 concerns a process for treatment of waste desulfurization catalysts of molybdenum-cobalt alumina type, to recover, on the one hand, vanadium and molybdenum, and to recover, on the other hand, cobalt and/or nickel. In this process, the catalyst is treated such that, without previous roasting in the presence of soda or carbonate of soda, the catalyst is air heated to between 650° and 850° C. The sodium molybdates and vanadates formed are extracted with water, and ammonium vanadate is prepared, and then the ammonium tetramolybdate is precipitated by hydrochloric acidification. The solid residue can be treated separately for extraction of alumina, nickel and cobalt. This method is for extraction of molybdenum and vanadium, and not for simultaneous extraction of alumina. As in the preceding method of the U.S. patent, this method does not permit collection of these metals in an anhydrous chloride state. In addition, the process requires direct treatment of the waste catalysts by alkaline compounds, which prevents recovering the hydrocarbons for subsequent use.

French Pat. No. 724,905 describes a process of treatment by hydrochloric acid or chlorine of materials containing molybdenum, tungsten and vanadium, in which it is possible to obtain these metals in chloride form if they are found in oxide state in the starting material. The chlorination is accomplished at a temperature on the order of 300° to 400° C. The carbon necessary for the reaction can be found in the starting material, which is the case with catalysts used for the hydrogenation of coal. The carbon necessary can also be added in the form of coke, lignite, wood charcoal, etc. The chlorides formed in a gaseous state can be recovered by condensation and dissolution in water. The process does not permit separation of the vanadium and molybdenum chlorides. Also, the process conditions are such that there is practically no formation of aluminum chloride.

The processes just described do not permit direct preparation of anhydrous metallic chlorides from waste catalysts.

Moreover, the prior art processes do not provide means for efficiently separating the aluminum chloride from at least one of the molybdenum and vanadium chlorides.

THE INVENTION

The process of the invention solves the above problems in obtaining metallic chlorides of high purity from waste catalysts containing compounds of these metals along with volatile materials and various impurities. This process, essentially using dry, i.e., anhydrous treatment steps, has as a significant aspect the recovery of the activated alumina support material for the catalysts by transforming them into a very pure anhydrous aluminum chloride fixed on the alumina in the form of chloride mixtures of $NaCl.AlCl_3$. It also permits simple and efficient separation of the molybdenum and vanadium chlorides from each other and also from the aluminum chloride. It is also possible in this process to recover the hydrocarbons and the carbon contained in the waste catalysts.

It is generally preferable to use waste catalysts as they are withdrawn from the petroleum treatment installations and without subjecting them to any treatment for separation of the volatile materials which they contain. These catalysts are generally in the form of small rods or pellets. The largest dimensions are generally less than one centimeter. They are constituted of an activated alumina support, or gamma alumina, which is porous and which is impregnated with compounds containing certain metals, particularly molybdenum, most often associated with cobalt or nickel. In the course of use of these catalysts, they fix vanadium compounds, carbon resulting from the partial decomposition of hydrocarbons, and sulfur, at least partially in the form of sulfides and also a certain number of other metallic or nonmetallic impurities, generally in combined form, such as for example nickel. Finally, in their raw state, these waste catalysts are of course still impregnated with a certain quantity of hydrocarbons.

The first step of the present process is the elimination of the hydrocarbons by a sufficiently selective process to avoid elimination of the carbon which is present in noncombined state in the pores of the waste catalyst. This can be obtained for example by the action of a solvent, for instance an organic solvent, as is conventional in the art, for elimination of the major part of the hydrocarbons contained in the pores of the catalyst. This solvent is then eliminated by distillation at a suitable temperature. The hydrocarbons can also be burned, in a strictly limited quantity of air so as to stop the combustion before the noncombined carbon is also oxidized. This is obtained by heating a mass of catalyst to a temperature on the order of 400° C. for approximately one half hour in a furnace in the presence of air but without forced circulation of the air. Then a combustion of the hydrocarbons is carried out, which is practically complete, but the major part of the noncombined carbon is not oxidized.

Alternatively a bed of spent hydrocarbon containing catalyst can be heated from the outside while contained in a closed treatment vessel with a flow of nitrogen through it, which engages the bed at a temperature on the order of 400° C., or better yet, passes through the bed. The nitrogen effluent becomes charged with volatile materials which distill slowly, a little at a time, and it is thus possible to recover them by a condensation procedure. A part of the hydrocarbons which are thus recovered can be used for heating the treatment furnace, and the other part is used otherwise. Tests have shown that the quantity of hydrocarbons thus extracted from the catalysts was on the order of from 10 to 20% by weight of these catalysts.

After the hydrocarbon extraction, the waste catalyst can be directly subjected to the action of the gaseous chlorine at a temperature of between 500° and 600° C. This operation can be effected for example in a vertical nickel column heated from the exterior and partially filled with spent catalyst, with a gaseous chlorine current injected at the base of the column while the volatile compounds which are formed are discharged at the top. Because of the presence of carbon in the pores of the catalyst, a reduction of the oxides is produced simultaneously, and particularly of the alumina, with chlorination of the reduced metal. The sulfur which is also present in the catalyst, principally in the form of metallic sulfides, like the carbon, probably also acts as an oxide reducer. However, when there is a great excess of carbon, i.e., a stoichiometric excess, relative to the quantities of oxides to be reduced, it is noted that the major part of the sulfur, and probably almost all of it, is found combined in the form of sulfur chloride in the gases which are discharged. Tests have shown that there is a very high yield or recovery, of chlorides of aluminum, molybdenum and vanadium from the spent catalysts treated, which recovery is generally above 90%. The chloride yields depend upon operating conditions and they are often a bit lower because an excess of chlorine must be present to optimize the process, but this is not a major problem, because this excess can be easily recycled.

The gases discharged from the chlorination column contain, besides the excess chlorine, all of the chlorides which are volatile at the treatment temperature of the elements contained in the treated catalysts. This has to do principally with aluminum chloride and molybdenum and vanadium chlorides. Sulfur chloride and generally also silicon chloride are also found to be discharged. Finally, the oxygen which was combined principally with the alumina is principally in the form of $CO_2$. The nickel and cobalt chlorides which are also formed are generally not volatile at the process conditions and they remain in the solid residue within the column. Their recovery can be effected, for example, by forming an aqueous solution with subsequent precipitation of the hydrates or the carbonates.

The separation of the aluminum chloride from the other compounds contained in the gases from the chlorination is effected very simply by passing these gases through a column containing granules of sodium chloride, heated to a temperature on the order of 115° to 500° C. and preferably 300° to 400° C. Under these conditions, a liquid phase is formed, the composition of which is generally $NaCl.AlCl_3$, which liquid phase flows to the base of the apparatus, thus isolating it from the gaseous phase. This double chloride can be used as is for a number of uses, such as for example the electrolytic preparation of aluminum. When using sodium chloride it is necessary to use an anhydrous sodium chloride.

Other means can be foreseen for carrying out this method for separation of the aluminum chloride. The anhydrous sodium chloride can be replaced by anhydrous potassium chloride, or another anydrous alkaline chloride, or a mixture of anhydrous alkaline chlorides.

The chloride vapors thus obtained are free of aluminum chloride and are then treated for the separation of the molybdenum chloride. It has been determined, totally unexpectedly, that a selective separation of the molybdenum chloride from the other compounds contained in the gaseous mixture is possible by passing it through a column containing granules of potassium chloride, prepared by crystallization from an aqueous solution, brought to a temperature between approximately 100° and 500° C. According to prior art literature, the vanadium chloride $VCl_4$ becomes fixed to the potassium chloride, producing a double chloride $VCl_3.3ClK$ (see Pascal Volume XII pages 132–133). In fact, it has been determined that, under the operating parameters herein a fixation of the molybdenum chloride by the potassium chloride is produced, while the vanadium chloride and the other compounds contained in the gaseous mixture are not retained. The molybdenum chloride, which is thus fixed in solid state to the surface of the granules of KCl, which is crystallized, can be recovered by forming an aqueous alkaline solution with subsequent precipitation of the molybdic acid in a known manner, or by any other suitable method.

The vanadium tetrachloride can be recovered very simply from a gaseous mixture issuing from the column filled with potassium chloride, by passing this gaseous mixture through a condenser at a temperature preferably on the order of 60° C., to avoid condensation of the silicon tetrachloride. Under these conditions, practically all of the vanadium tetrachloride can be condensed at a relatively high degree of purity. The other compounds of the gaseous mixture are generally not retained by this condenser and remain in a gaseous state. The gaseous mixture, at discharge from the condenser, can if necessary be passed through another condenser at a lower temperature to retain the volatile silicon and sulfur chlorides, or can be simply passed into an absorption tower containing soda.

Instead of using selective condensation, the gaseous mixture containing the vanadium tetrachloride can also be bubbled into water and after addition of a base (sodium or potassium), can be precipitated by addition of ammonium chloride, as the corresponding metavanadate of ammonium.

The process just described can have numerous variations. The initial step for the elimination of hydrocarbons can be carried out continuously in a heated column fed with raw waste catalyst at the top, while the catalyst with hydrocarbons removed is extracted at the bottom. A nitrogen current passing through the column from bottom to top draws the hydrocarbon vapors to the outside. The following step of chlorination of the catalyst without hydrocarbons, which previously impregnated the catalyst can be effected in a column with a chlorine current running through it upwardly and constituted of a silica tube heated from the outside by electrical resistance heating means. It is also possible to foresee use of a column having a refractory lining resistant to chlorine and heated from the inside by a carbon electrical resistance heating means. Such a column could have means for continuous introduction of waste catalyst to be chlorinated at the top, and means for extraction of residues at the bottom.

The column utilized to retain the aluminum chloride by means of the anhydrous sodium chloride can also be used continuously, by introducing solid granular sodium chloride at the top, while the liquid phase with aluminum chloride and sodium chloride is removed continuously at the bottom. Finally, continuous operation of the potassium chloride-containing column to retain the molybdenum chloride can also be carried out.

The following is a nonlimiting example of the invention carried out on a small quantity of waste catalyst.

A sample of 1 kg of a waste catalyst with an active alumina support and containing V, Mo, Co and Ni compounds was used. This sample was first treated for two hours at 400° C. in a nitrogen current, to eliminate the hydrocarbons and the water. The treatment was carried out in a tubular enclosure rotating on its horizontal axis and of 140 mm diameter and 600 mm length, heated from the outside and having a flow of nitrogen running through at a rate of 20 l./hr. After two hours of treatment, it was cooled. 825 g of catalyst with volatile materials removed was recovered, and for the most part the volatiles were recovered by condensation. These volatiles had approximately ⅓ water and ⅔ a mixture of hydrocarbonated compounds. After this treatment the principal constituent contents, by weight, were as follows:

| C | 21% | Ni | 2.4% |
|---|---|---|---|
| S | 8.4% | Co | 1.7% |
| V | 9.4% | Si | 0.14% |
| Mo | 5.6% | Al | 27% |

This catalyst was then chlorinated in a vertical nickel tube of 80 mm diameter and 500 mm height, heated from the outside to a temperature between 500° and 600° C. A chlorine flow was injected from bottom to top at approximately 80 l./hr. for 10 hours. A fixed residue of 245 g was recovered containing by weight:

| C | 36% | Ni | 8.1% |
|---|---|---|---|
| S | 4.8% | Al | 2.8% |
| Co | 5.6% | Si | 0.6% |

This residue contained only traces of Mo and V, which shows that these two metals had been entirely volatilized in the form of chlorides.

These metals were then separated from an aqueous solution thereof, for example, in the form of hydrates or carbonates by known methods.

The gaseous phase from the chlorination step was introduced to the bottom of a column filled with granules of 1 to 2 cm of sodium chloride heated to 350° C. At the base of the column was observed the outflow of approximately 1 kg of a compound, the composition of which corresponded essentially to $AlCl_3 \cdot NaCl$. The other constituents of the gaseous mixture not retained by the salt were discharged at the top of the column, particularly the molybdenum and vanadium chlorides.

These gases were then injected at the base of a vertical column of approximately 60 mm diameter and 40 cm height, filled with potassium chloride in crystallized state obtained by crystallization from an aqueous solution and comprising grains of approximately 1 to 2 mm and at a temperature of 400° C. In this column, the molybdenum chloride is fixed to the surface of the KCl grains.

After passing through the bed of KCl, the gases were discharged from the column at the top and then passed through a condenser at a temperature of 60° C., in which the vanadium chloride $VCl_4$ is retained.

Finally, the residual gases were passed over absorbers of known type intended to retain the silicon chloride and sulfur chloride.

Tests have shown that the quantity of molybdenum retained in the form of chloride by the column containing the potassium chloride exceeds 90% of the molybdenum present in the waste catalyst. The quantity of vanadium recovered on the condenser is also more than 90% of the vanadium present in the waste catalyst.

We claim:

1. A process for preparation from waste catalysts on an alumina support base which have been used for the treatment of hydrocarbons, of anhydrous metallic chlorides selected from the group consisting of chlorides of aluminum, molybdenum, vanadium, cobalt and nickel, comprising:
   (a) separating hydrocarbons which impregnated the waste catalyst support base during use, under conditions wherein a major portion of carbon present in an uncombined state is not oxidized or removed from within the alumina support base;
   (b) chlorinating the waste catalyst treated as in step (a) by subjecting the catalyst to a flow of gaseous chlorine at a temperature sufficient to sequentially reduce metal oxides present and form volatile and non-volatile chlorides of the reduced metals;
   (c) passing a gaseous effluent of (b) through an anhydrous sodium chloride at a temperature of between about 115° C. to about 500° C. to selectively fix the aluminum chloride in the form of a complex salt or mixture of low melting point salts; and;
   (d) at least recovering an aluminum chloride product.

2. The process as in claim 1, wherein after selective fixation of aluminum chloride by anhydrous sodium chloride, gases which are not retained are passed through an absorption column which contains generally nonanhydrous crystallized potassium chloride brought to a temperature of 100° to 500° C., which fixes the major part of the molybdenum chloride.

3. The process as in claim 1, wherein the separation of the hydrocarbons impregnated in the waste catalyst is effected by combustion at a temperature of 300° to 500° C.

4. The process as in claim 2, wherein the separation of the hydrocarbons impregnated in the waste catalyst is effected by combustion at a temperature of 300° to 500° C.

5. The process as in claim 1, wherein the separation of the hydrocarbons is effected by contact with nitrogen at a temperature between 300° to 500° C.

6. The process as in claim 2, wherein the separation of the hydrocarbons is effected by contact with nitrogen at a temperature between 300° and 500° C.

7. The process as in claim 2, wherein the gases issuing from the molybdenum chloride absorption column pass into a condenser at a temperature of approximately 60° to 100° C., to retain vanadium chloride.

8. The process as in claim 4, wherein the gases issuing from the molybdenum chloride absorption column pass into a condenser at a temperature of approximately 60° to 100° C., to retain vanadium chloride.

9. The process as in claim 6, wherein the gases issuing from the molybdenum chloride absorption column pass into a condenser at a temperature of approximately 60° to 100° C., to retain vanadium chloride.

10. The process as in claim 2, wherein the gases issuing from the molybdenum chloride absorption column are bubbled into water which retains a portion of the vanadium tetrachloride, and wherein the solution obtained is treated by ammonium chloride or a metallic chloride, in a basic milieu, to precipitate an insoluble vanadate.

11. The process as in claim 4, wherein the gases issuing from the molybdenum chloride absorption column are bubbled into water which retains a portion of the vanadium tetrachloride, and wherein the solution obtained is treated by ammonium chloride or a metallic chloride, in a basic milieu, to precipitate an insoluble vanadate.

12. The process as in claim 6, wherein the gases issuing from the molybdenum chloride absorption column are bubbled into water which retains a portion of the vanadium tetrachloride, and wherein the solution obtained is treated by ammonium chloride or a metallic chloride, in a basic milieu, to precipitate an insoluble vanadate.

13. The process as in claim 1, wherein a solid residue from the chlorination of the catalyst is treated by water to dissolve the Co and Ni chlorides which are thereafter recovered.

14. A process for preparation from waste catalysts on an alumina support base which have been used for the treatment of hydrocarbons, of anhydrous metallic chlorides selected from the group consisting of chlorides of aluminum, molybdenum, vanadium, cobalt and nickel, comprising:
   (a) separating hydrocarbons which impregnated the waste catalyst support base during use, under conditions wherein a major portion of carbon present in an uncombined state is not oxidized or removed from within the alumina support base;
   (b) chlorinating the waste catalyst treated as in step (a) by subjecting the catalyst to a flow of gaseous chlorine at a temperature sufficient to sequentially reduce metal oxides present and form volatile and non-volatile chlorides of the reduced metals;
   (c) passing a gaseous effluent of (b) through an anhydrous sodium chloride at a temperature of between about 115° C. to about 500° C. to selectively fix the aluminum chloride in the form of a complex salt or mixture of low melting point salts;
   (d) at least recovering an aluminum chloride product; and
   wherein after selective fixation of aluminum chloride by an anhydrous sodium chloride, gases which are not retained are passed through an absorption column which contains generally non-anhydrous crystallized potassium chloride brought to a temperature of 100° to 500° C., which fixes the major part of the molybdenum chloride.

15. The process as in claim 14, wherein the separation of the hydrocarbons impregnated in the waste catalyst is effected by combustion at a temperature of 300° to 500° C.

16. The process as in claim 14, wherein the separation of the hydrocarbons is effected by contact with nitrogen at a temperature between 300° and 500° C.

17. The process as in claim 14, wherein the gases issuing from the molybdenum chloride absorption column pass into a condenser at a temperature of approximately 60° to 100° C., to retain vanadium chloride.

18. The process as in claim 14, wherein the gases issuing from the molybdenum chloride absorption column are bubbled into water which retains a portion of the vanadium tetrachloride, and wherein the solution obtained is treated by ammonium chloride or a metallic chloride, in a basic milieu, to precipitate an insoluble vanadate.

* * * * *